United States Patent
Campbell et al.

(10) Patent No.: US 7,933,666 B2
(45) Date of Patent: Apr. 26, 2011

(54) ADJUSTABLE DATA COLLECTION RATE FOR EMBEDDED HISTORIANS

(75) Inventors: John T. Campbell, Bridgeville, PA (US); Robert J. McGreevy, Oswego, IL (US); Robert J. Herbst, Aurora, OH (US); John J. Baier, Mentor, OH (US); Taryl J. Jasper, South Euclid, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 170 days.

(21) Appl. No.: 11/558,710

(22) Filed: Nov. 10, 2006

(65) Prior Publication Data

US 2008/0114571 A1 May 15, 2008

(51) Int. Cl.
G05B 21/02 (2006.01)
(52) U.S. Cl. ............ 700/74; 702/189; 713/375; 713/400
(58) Field of Classification Search .................. 702/179, 702/189, 187, 182; 700/74, 51, 34, 46, 52, 700/53, 55, 73, 75; 703/2, 6; 707/10; 709/248; 713/375, 400
See application file for complete search history.

(56) References Cited

U.S. PATENT DOCUMENTS

| | | | |
|---|---|---|---|
| 4,510,565 A | 4/1985 | Dummermuth |
| 4,553,205 A | 11/1985 | Porchia |
| 4,616,333 A | 10/1986 | Shimoni |
| 4,718,025 A | 1/1988 | Minor et al. |
| 4,731,735 A | 3/1988 | Borgendale et al. |
| 4,773,028 A | 9/1988 | Tallman |
| 4,831,529 A | 5/1989 | Miike et al. |
| 4,975,865 A | 12/1990 | Carrette et al. |
| 5,003,469 A | 3/1991 | Kamiyama et al. |
| 5,051,932 A | 9/1991 | Inove et al. |
| 5,274,781 A | 12/1993 | Gibart |
| 5,452,201 A | 9/1995 | Pieronek et al. |
| 5,568,383 A | 10/1996 | Johnson et al. |

(Continued)

FOREIGN PATENT DOCUMENTS

EP 0490864 6/1992

(Continued)

OTHER PUBLICATIONS

"Major Canadian Natural Gas Producer Buys AnyWhere/AnyTime Services from Industrial Evolution" Mar. 12, 2001, Industrial Evolution pp. 1.

(Continued)

Primary Examiner — Kidest Bahta
Assistant Examiner — Sheela Rao
(74) Attorney, Agent, or Firm — Turocy & Watson LLP; William R. Walbrun; John M. Miller

(57) ABSTRACT

Systems and methods that can vary a data collection rate via a rate adjustment component, to collect data with different level of granularity. The rate adjustment component can further include an estimation component that can automatically predict a required sampling rate for a stage of an operation, based on statistical models and data collected for similar operations and/or history data. Such difference in the granularity level can initiate in part in response to fault detection, alert triggering, and the like. Accordingly, future trouble shooting efforts can be performed with respect to data that is typically collected at an adjustable rate.

29 Claims, 10 Drawing Sheets

U.S. PATENT DOCUMENTS

| | | | |
|---|---|---|---|
| 5,805,442 A | 9/1998 | Crater et al. | |
| 5,901,323 A | 5/1999 | Milliken et al. | |
| 5,943,675 A | 8/1999 | Keith et al. | |
| 5,991,793 A | 11/1999 | Mukaida et al. | |
| 6,092,036 A | 7/2000 | Hamann | |
| 6,110,214 A | 8/2000 | Klimasauskas | |
| 6,139,201 A | 10/2000 | Carbonell et al. | |
| 6,198,480 B1 | 3/2001 | Cotugno et al. | |
| 6,204,782 B1 | 3/2001 | Gonzalez et al. | |
| 6,219,649 B1 | 4/2001 | Jameson | |
| 6,233,623 B1 | 5/2001 | Jeffords et al. | |
| 6,252,589 B1 | 6/2001 | Rettig et al. | |
| 6,263,487 B1 | 7/2001 | Stripf et al. | |
| 6,298,393 B1 | 10/2001 | Hopsecger | |
| 6,298,454 B1 | 10/2001 | Schleiss et al. | |
| 6,385,496 B1 | 5/2002 | Irwin et al. | |
| 6,411,987 B1 | 6/2002 | Steger et al. | |
| 6,505,247 B1 | 1/2003 | Steger et al. | |
| 6,536,029 B1 | 3/2003 | Boggs et al. | |
| 6,539,271 B2 | 3/2003 | Lech et al. | |
| 6,559,861 B1 | 5/2003 | Kennelly et al. | |
| 6,574,639 B2 | 6/2003 | Carey et al. | |
| 6,584,488 B1 | 6/2003 | Brenner et al. | |
| 6,618,856 B2 | 9/2003 | Coburn et al. | |
| 6,633,782 B1 | 10/2003 | Schleiss et al. | |
| 6,701,324 B1 | 3/2004 | Cochran et al. | |
| 6,754,668 B2 | 6/2004 | Noble et al. | |
| 6,754,885 B1 | 6/2004 | Dardinski et al. | |
| 6,766,214 B1* | 7/2004 | Wang et al. | 700/121 |
| 6,795,798 B2 | 9/2004 | Eryurek et al. | |
| 6,799,148 B2 | 9/2004 | Ling et al. | |
| 6,847,850 B2 | 1/2005 | Grumelart | |
| 6,847,854 B2 | 1/2005 | Discenzo | |
| 6,865,644 B2 | 3/2005 | Husted et al. | |
| 6,952,727 B1 | 10/2005 | Lindner et al. | |
| 6,975,913 B2 | 12/2005 | Kreidler et al. | |
| 7,043,311 B2 | 5/2006 | Nixon et al. | |
| 7,050,873 B1 | 5/2006 | Discenzo | |
| 7,069,201 B1 | 6/2006 | Lindner et al. | |
| 7,152,222 B2 | 12/2006 | Kumhyr et al. | |
| 7,181,370 B2 | 2/2007 | Furem et al. | |
| 7,206,646 B2 | 4/2007 | Nixon et al. | |
| 7,206,965 B2 | 4/2007 | Roddy et al. | |
| 7,218,974 B2 | 5/2007 | Rumi et al. | |
| 7,228,310 B2 | 6/2007 | O'Brien | |
| 7,249,356 B1 | 7/2007 | Wilson et al. | |
| 7,272,665 B2 | 9/2007 | Yamada et al. | |
| 7,275,062 B2 | 9/2007 | Deitz et al. | |
| 7,286,888 B2 | 10/2007 | Monette et al. | |
| 7,299,367 B2 | 11/2007 | Hamm et al. | |
| 7,328,078 B2 | 2/2008 | Sanford et al. | |
| 7,359,930 B2 | 4/2008 | Jackson et al. | |
| 7,406,453 B2 | 7/2008 | Mundie et al. | |
| 7,574,417 B1 | 8/2009 | McGreevy et al. | |
| 7,584,216 B2 | 9/2009 | Travieso et al. | |
| 7,616,095 B2 | 11/2009 | Jones et al. | |
| 7,627,385 B2 | 12/2009 | McGreevy et al. | |
| 7,684,876 B2 | 3/2010 | Grgic | |
| 7,693,585 B2 | 4/2010 | Kalan et al. | |
| 7,742,833 B1 | 6/2010 | Herbst et al. | |
| 2002/0019839 A1 | 2/2002 | Shiu | |
| 2002/0069235 A1 | 6/2002 | Chen | |
| 2002/0120744 A1 | 8/2002 | Chellis et al. | |
| 2002/0133523 A1 | 9/2002 | Ambler et al. | |
| 2002/0169907 A1 | 11/2002 | Candea et al. | |
| 2002/0174263 A1 | 11/2002 | Codd et al. | |
| 2002/0184601 A1 | 12/2002 | Fitzhenry et al. | |
| 2002/0184610 A1 | 12/2002 | Chong et al. | |
| 2003/0014130 A1 | 1/2003 | Grumelart | |
| 2003/0041135 A1 | 2/2003 | Keyes et al. | |
| 2003/0100958 A1 | 5/2003 | Cachat et al. | |
| 2003/0101208 A1 | 5/2003 | Chauvel et al. | |
| 2003/0130899 A1 | 7/2003 | Ferguson et al. | |
| 2003/0172107 A1 | 9/2003 | Leyfer et al. | |
| 2003/0182303 A1 | 9/2003 | Gibson | |
| 2004/0153437 A1 | 8/2004 | Buchan | |
| 2004/0181294 A1 | 9/2004 | Deitz et al. | |
| 2004/0225649 A1 | 11/2004 | Yeo et al. | |
| 2005/0071755 A1 | 3/2005 | Harrington et al. | |
| 2005/0085928 A1 | 4/2005 | Shani | |
| 2005/0198034 A1* | 9/2005 | Boyer | 707/10 |
| 2005/0198406 A1 | 9/2005 | Sichner | |
| 2005/0203648 A1 | 9/2005 | Martin | |
| 2005/0210337 A1 | 9/2005 | Chester et al. | |
| 2006/0004827 A1 | 1/2006 | Stuart | |
| 2006/0020928 A1 | 1/2006 | Holloway et al. | |
| 2006/0026559 A1 | 2/2006 | Gunturi et al. | |
| 2006/0067334 A1 | 3/2006 | Ougarov et al. | |
| 2006/0161268 A1 | 7/2006 | Frensch et al. | |
| 2006/0259160 A1 | 11/2006 | Hood et al. | |
| 2006/0291283 A1 | 12/2006 | Jin et al. | |
| 2006/0294502 A1 | 12/2006 | Das et al. | |
| 2007/0006039 A1 | 1/2007 | Fichter et al. | |
| 2007/0027913 A1 | 2/2007 | Jensen et al. | |
| 2007/0028070 A1 | 2/2007 | Avergun et al. | |
| 2007/0038610 A1 | 2/2007 | Omoigui | |
| 2007/0050348 A1 | 3/2007 | Aharoni et al. | |
| 2007/0073744 A1 | 3/2007 | McVeigh et al. | |
| 2007/0112447 A1* | 5/2007 | McGreevy et al. | 700/83 |
| 2007/0112801 A1 | 5/2007 | McGreevy et al. | |
| 2007/0136533 A1 | 6/2007 | Church et al. | |
| 2007/0142941 A1 | 6/2007 | McGreevy et al. | |
| 2007/0156770 A1 | 7/2007 | Espelien | |
| 2007/0244964 A1 | 10/2007 | Challenger et al. | |
| 2007/0282577 A1 | 12/2007 | Lind | |
| 2007/0288795 A1 | 12/2007 | Leung et al. | |
| 2007/0294078 A1 | 12/2007 | Kim et al. | |
| 2008/0027678 A1 | 1/2008 | Miller | |
| 2008/0082577 A1 | 4/2008 | Hood et al. | |
| 2008/0126408 A1 | 5/2008 | Middleton | |
| 2008/0313228 A1 | 12/2008 | Clark et al. | |

FOREIGN PATENT DOCUMENTS

| | | |
|---|---|---|
| EP | 1109107 | 6/2001 |
| EP | 1307823 | 5/2003 |
| GB | 2347234 | 8/2000 |
| GB | 2353616 A1 | 2/2001 |
| WO | 2004027531 A1 | 4/2004 |
| WO | 2005006130 A2 | 1/2005 |
| WO | 2005006130 A3 | 1/2005 |

OTHER PUBLICATIONS

Real Time Intelligence at the Source-Deploying and EMbedded Historian. Users Conference 2005, pp. 1.

Miller, et al. "Extending the Reach of Enterprise Data Management in a World of M2M." ISA EXPO. Oct. 2005, pp. 1-7.

"Proficy Historian"; Dec. 16, 2004, GE FANUC, pp. 1-8.

European Search Report dated Feb. 22, 2008 for European Patent Application Serial No. EP 07 11 7388, 1 Page.

European Search Report dated Jan. 20, 2009 for European Patent Application No. EP08156281, 6 Pages.

EP Office Action for Application No. 08165215.8-1243 dated Mar. 3, 2009, 2 pages.

European Search Report and Written Opinion for European Application No. EP 08 16 5215, dated Dec. 8, 2008, 6 pages.

Sakharov. Macro-Processing in High-Level Languages. ACM SIGPLAN Notices, vol. 27, No. 11, Nov. 1, 1992, pp. 59-66, XP000328425, ISSN: 0362-1340. Last accessed Jan. 20, 2009, 18 pages.

Cardoso, et al. Macro-Based Hardware Compilation of Java (TM) Bytecodes Into a Dynamic Reconfigurable Computing System, Apr. 21, 1999. In IEEE Seventh Symposium on Field Programmable Custom Computing Machines, (FCCM'99). Napa Valley, California, Apr. 21-23, 1999 http://citeseerx.ist.psu.edu/viewdoc/summary?doi=10.1.1.41.8292. Last accessed Jan. 21, 2008, 10 pages.

European Search Report dated Feb. 5, 2008 for European Patent Application No. EP07117614, 8 pgs.

Alvestrand. "Tags for the Identification of Languages: rfc 1766. txt," Internet Engineering Task Force, Mar. 1995, XP015007553, Issn: 0000-0003. ftp://ftp.isi.edu/in-notes/rfc1766.txt. Last accessed Jun. 6, 2008, 9 pages.

European Search Report dated May 2, 2008 for European Patent Application No. EP07117622, 2 pgs.

Power RICH System, Enterprise Edition, Historian (PRS EE Historian) Version 1.5, last accessed Feb. 3, 2008, 15 pages.
Wonderware Plant Intelligence Solution Helps Aria Foods Deliver Fresh Milk Products to the Tables of Europe. Last accessed Dec. 3, 2008, 4 pages.
European Search Report dated Dec. 18, 2007 for European Patent Application Serial No. 07117364.5-2221, 2 Pages.
OA dated Dec. 18, 2008 for U.S. App. No. 11/536,522, 15 pages.
OA dated Apr. 3, 2009 for U.S. Appl. No. 11/536,522, 20 pages.
OA dated Jul. 21, 2008 for U.S. Appl. No. 11/536,522, 21 pages.
OA dated Oct. 13, 2009 for U.S. Appl. No. 11/536,522, 22 pages.
OA dated Sep. 16, 2009 for U.S. Appl. No. 11/558,705, 23 pages.
OA dated Apr. 22, 2009 for U.S. Appl. No. 11/558,705, 23 pages.
OA dated Dec. 3, 2008 for U.S. Appl. No. 11/536,566, 35 pages.
OA dated Jul. 23, 2008 for U.S. Appl. No. 11/536,535, 31 pages.
OA dated Jul. 28, 2008 for U.S. Appl. No. 11/536,545, 26 pages.
OA dated Dec. 12, 2008 for U.S. Appl. No. 11/536,545, 18 pages.
OA dated Jul. 10, 2009 for U.S. Appl. No. 11/536,545, 30 pages.
OA dated Jan. 26, 2009 for U.S. Appl. No. 11/536,535, 40 pages.
CN OA Due Dec. 29, 2008 for Chinese Patent Application No. 200710162327.9, 6 pages.
OA dated Mar. 30, 2010 for U.S. Appl. No. 11/558,705, 44 pages.
European Search Report dated Mar. 25, 2010 for European Patent Application No. EP 07 12 0362, 6 pages.
"High Level Triggers, Data Acquisition and Controls." ATLAS Technical Design Report, Jun. 30, 2003, pp. 1-370, XP002570453, Chapters 1-7, 9, 11, 13. http://cdsweb.cern.ch/record/616089/files/cer-002375189.pdf. Last accessed Apr. 1, 2010, 196 pages.
Vermeulen, et al. "ATLAS Dataflow: the Read-Out Subsystem, Results from Trigger and Data Acquisition System Testbed Studies and from Modeling." 14th IEEE—NPSS Real time Conference, Stockholm, Sweden, Jun. 4-10, 2005, pp. 270-274, XP010859081, ISBN: 978-0-7803-9183-3.
Gameiro, et al. "The ROD Crate DAQ of the ATLAS Data Acquisition System." 14th IEEE—NPSS Real time Conference, Stockholm, Sweden, Jun. 4-10, 2005, pp. 527-531, XP010859117, ISBN: 978-0-7803-9183-3.
European Search Report dated Mar. 25, 2010 for European Patent Application No. EP 07 12 0357, 5 pages.
OA dated Mar. 24, 2010 for U.S. Appl. No. 11/750,193, 36 pages.
European Search Report dated Mar. 10, 2010 for European Application Serial No. EP 08 16 4957, 7 pages.
Charbonnier, et al. "Trends Extraction and Analysis for Complex System Monitoring and Decision Support."Feb. 1, 2005, Engineering Applications of Artificial Intelligence, Pineridge Press, Swansea, GB, pp. 21-36, XP025299588, ISSN: 0952-1976.
Uraikul, et al. "Artificial Intelligence for Monitoring and Supervisory Control of Process Systems." Nov. 30, 2006, Engineering Applications of Artificial Intelligence, Pineridge Press, Swansea, GB, pp. 115-131, XP005786108, ISSN: 0957-1976.
OA dated Apr. 1, 2010 for U.S. Appl. No. 11/863,216, 28 pages.
OA dated Jun. 25, 2010 for U.S. Appl. No. 11/862,182, 41 pages.
OA dated May 27, 2010 U.S. Appl. No. 11/537,110, 77 pages.
OA dated Jul. 22, 2010 for U.S. Appl. No. 11/862, 183, 39 pages.
A new general purpose compression method for searching in large collection, Bhadade, U.S.; Sharma, V.K.; Trivedi, A.I.; Tencon 2007—2007 IEEE Region 10 Conference Digital Object Identifier: 10.11 09ITENCON.2007.4428935. Publication Year: 2007 , pp. 1-4.
Input Data Representation for Self-Organizing Map in Software Classification, Yuqing Lin; Huilin Ye; Knowledge Acquisition and Modeling, 2009. KAM '09. Second International Symposium on Volume: 2 Digital Object Identifier: 10.11 09/KAM2009.151, Publication Year: 2009 , pp. 350-353.
Supervised and Traditional Term Weighting Methods for Automatic Text Categorization, Man Lan; Chew Lim Tan; Jian Su; Yue Lu; Pattern Analysis and Machine Intelligence, IEEE Transactions on vol. 31 , Issue: 4. Digital Object Identifier: 10.11 09/TPAMI2008.11 0 Publication Year: 2009 , pp. 721-735.
Selecting predicate logic for knowledge representation by comparative study of knowledge representation schemes, Ali, A.; Khan, M.A.; Emerging Technologies, 2009. ICET 2009. International Conference on Digital Object Identifier: 10.11 09/ICET2009.5353207 Publication Year: 2009 , pp. 23-28.
Notice of Allowance dated Jun. 13, 2010 for U.S. Appl. No. 11/862,891, 49 pages.
OA dated Jul. 8, 2010 for U.S. Appl. No. 11/558,710, 28 pages.
OA dated Jun. 11, 2010 for U.S. Appl. U.S. Appl. No. 11/862,180, 27 pages.
OA dated Jul. 23, 2010 for U.S. Appl. No. 11/536,550, 51 pages.
OA dated Aug. 23, 2010 for U.S. Appl. No. 11/558,705, 44 pages.
OA dated Sep. 17, 2010 for U.S. Appl. No. 11/864,634, 43 pages.
OA dated Oct. 14, 2010 for U.S. Appl. No. 11/862,861, 43 pages.
OA dated Sep. 3, 2010 for U.S. Appl. No. 11/750,193, 68 pages.
European Search Report dated Oct. 22, 2010 for European Patent Application No. EP 08 16 5010, 10 pages.

* cited by examiner

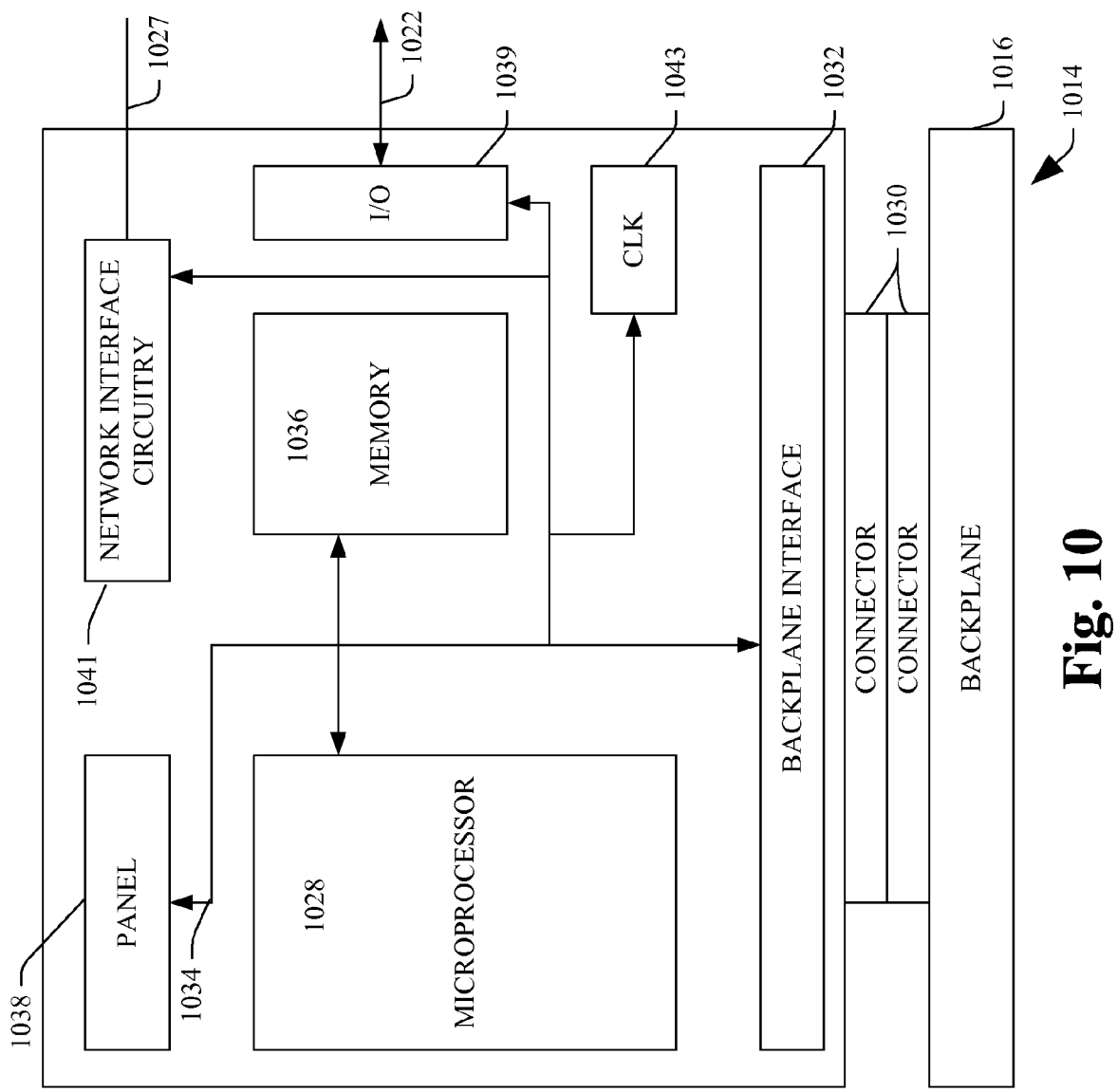

ADJUSTABLE DATA COLLECTION RATE FOR EMBEDDED HISTORIANS

TECHNICAL FIELD

The subject invention relates generally to historian components associated with industrial controllers and more particularly to varying a rate of data collection for an embedded historian

BACKGROUND

Industrial controllers are special-purpose computers utilized for controlling industrial processes, manufacturing equipment, and other factory automation, such as data collection or networked systems. At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. Differences in PLCs are typically dependent on the number of Input/Output (I/O) they can process, amount of memory, number and type of instructions, and speed of the PLC central processing unit (CPU).

In a more macro sense than the controller, businesses have become more complex in that higher order business systems or computers often need to exchange data with such controllers. For instance, an industrial automation enterprise may include several plants in different locations. Modern drivers such as efficiency and productivity improvement, and cost-reduction, are requiring manufacturers to collect, analyze, and optimize data and metrics from global manufacturing sites. For example, a food company can have several plants located across the globe for producing a certain brand of food. These factories in the past were standalone, with minimum data collection and comparison of metrics with other similar factories. In the networked world of today, manufacturers are demanding real-time data from their factories to drive optimization and productivity. Conventional control systems architectures are not equipped to allow a seamless exchange of data between these various components of the enterprise.

Another requirement of modern control system architectures is the ability to record and store data in order to maintain compliance with Food and Drug Administration regulations such as Regulation 21 CFR Part 11. A particular and common solution for recording data includes providing a local recording module that often occupies a slot in a controller backplane such as a PC-Historian which is an industrial computer for the controller backplane, and employs a transitional layer to supply an indirect interface to the controller. This includes a platform that provides high speed, time series, data storage and retrieval with both local and remote control processors. The PC-Historian communicates with controllers directly through the backplane and can communicate remotely via a network interface. The PC-Historian allows archiving data from the controller to an Archive Engine which provides additional storage capabilities.

In general, conventional historian processors enable high-speed real-time data collection by communicating directly with the control processor across the backplane for fast data collection speeds. This includes handling large quantities of data over extended time periods while providing efficient storage and retrieval of process data over extended periods of time. These solutions are generally employed for electronic documentation and provide an audit trail and data flags for tracking modified, inserted, or incomplete data. In order to configure such products, a Graphical User Interface (GUI) can be provided to map controller tags defined in a local or remote processor to a data historian file.

Data from controllers and industrial modules are typically collected and analyzed to determine a source of a problem. In general, controllers are fitted with a small amount of data storage. If data is desirably retained beyond the two gigabytes, an operator should determine which data is desirably kept for a longer period of time, and which data is to be deleted. Likewise, after predetermined time period, or when storage capacity of the controller is reached, data from the controller can be archived. Nonetheless, if data is to be analyzed, then such analysis can be performed with respect to data that is typically collected at a fixed rate.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

The subject innovation provides for systems and methods that can vary a data collection rate for embedded historians via a rate adjustment component, to collect data with different levels of granularity. Such difference in the granularity level can be partially in response to fault detection, alert triggering, and the like. Accordingly, future trouble shooting efforts can be performed with respect to data that is typically collected at an adjustable rate. In general, the embedded historians of the subject innovation (unlike conventional PC historians) supply a direct interface to controllers without employing a transitional layer, and hence provide a substantially higher data exchange rate as compared to conventional PC historians.

In a related aspect, a higher sample rate for data collection (than sample rate during normal operation) can be employed when collecting data from an operation stage that is deemed more critical than the rest of the operation. The rate adjustment component can be associated with an embedded historian that can be integrated as part of a controller or industrial unit. Moreover, such adjustable rate component can communicate with controllers directly through the backplane, or can communicate remotely via a network interface. In a related aspect, a storage medium associated with the embedded historian/recording module can selectively decay stored data (e.g., a gradual purge) based on data importance, likelihood of use, and the like.

According to a further aspect of the subject innovation, the rate adjustment component can further include an estimation component that can automatically predict a required sampling rate for a stage of an operation, based on statistical models and collected for similar operations and/or history data. For example, a crude model can be constructed for an initial subset of the data using earlier/prior collected data from similar processes. This allows statistical information to be gleaned from extremely large sets of distributed information related to similar industrial operation. The model can then be evaluated and/or altered via feedback (e.g., user input). Each module can be programmed to be evaluated for the sampling rate periodically, or upon occurrence of an event (e.g., an alarm trigger, receipt of an e-mail notification message, and the like). Various artificial intelligence systems/methodologies can also be employed to facilitate estimation/prediction of the data collection rate (e.g., sampling rate.)

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 10 illustrates an industrial setting with a backplane and associated modules that can employ a rate adjustment component in accordance with an aspect of the subject innovation.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
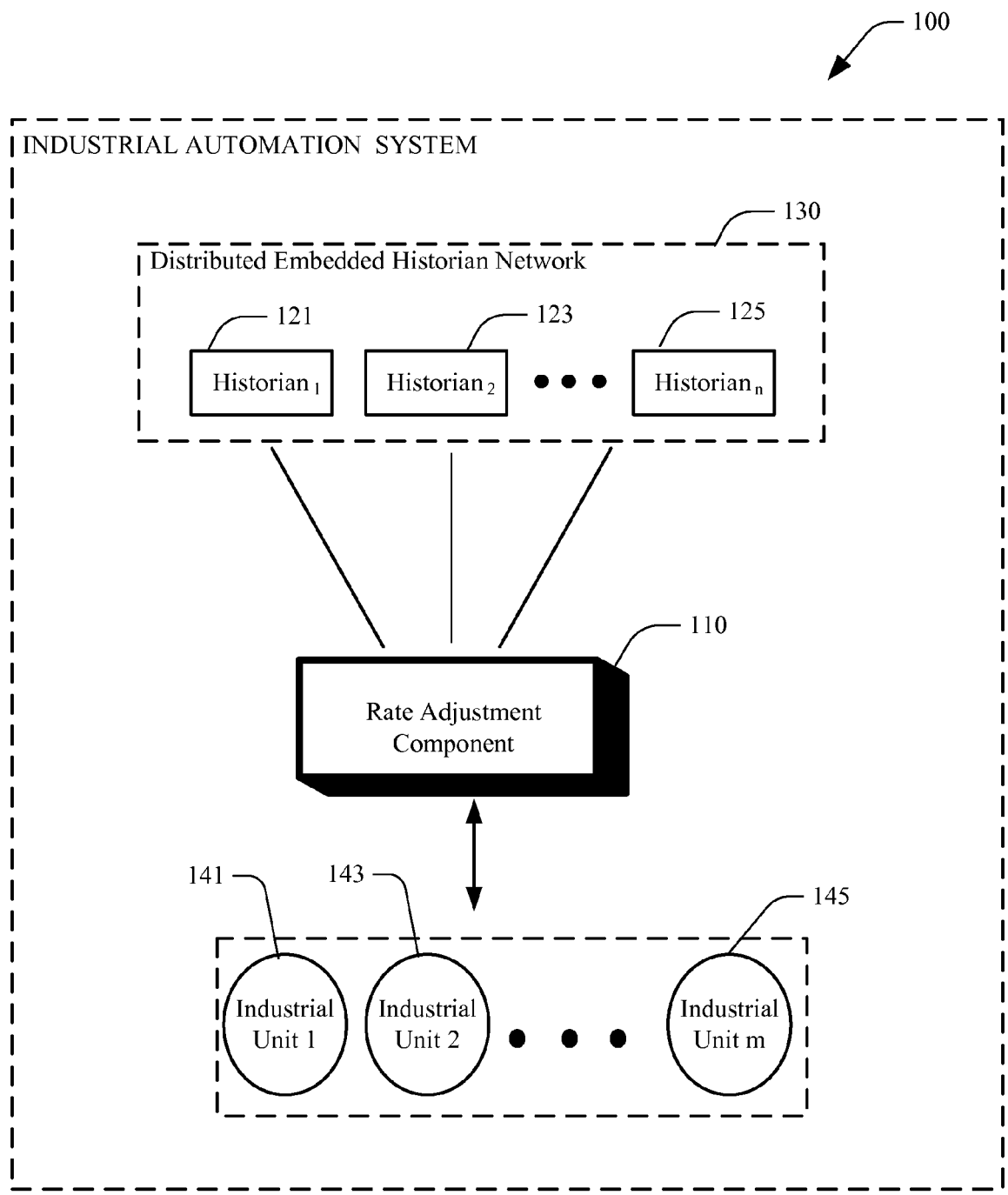
FIG. 1 is a schematic block diagram of a system that varies a data collection rate in accordance with an aspect of the subject innovation.

FIG. 1 illustrates a rate adjustment component 110 that is associated with collection of data from an embedded historian network of an industrial programmer system 100 (e.g., a network of controller devices), to facilitate persistence of history data for future trouble shooting. Such rate adjustment component 110 can adjust sampling rats of data collected from a plurality of modules industrial/units within the system 100. Hence, different level of granularity for data collection can be employed at various stages of an industrial process. Put differently, the subject innovation provides for systems and methods that can vary a data sampling rate via the rate adjustment component 110, in part in response to fault detection, alert triggering, and the like. Accordingly, future trouble shooting efforts can be performed with respect to data that is typically collected at an adjustable sample rate. For example, a higher sample rate (than sample rate during normal operation) can be employed when collecting data from an operation stage that is deemed more critical than the rest of the operation. The rate adjustment component 110 can be associated with embedded historians 121, 123, 125 (1 to n, n being an integer), wherein such embedded historians 121, 123, 125 supply a direct interface to controllers without employing a transitional layer, and hence provide a substantially higher data exchange rate as compared to conventional PC historians. Accordingly, a distributed historian framework 130 is provided, wherein historical data types can be collected at various levels of granularity (e.g., in accordance with an organizational model of a hierarchical system that is distributed across various elements of an enterprise.) Such an arrangement enables a user (e.g., plant engineer, industrial operator) to define a desired rate of data collection and/or sampling throughout an industrial process. Moreover, such data collection rate can be automatically designated as will be described in detail infra.

The rate adjustment component 110 can be part of applications running on a control unit, which can function as a management control center for the industrial network system 100. Moreover, such adjustable sampling rate component 110 can communicate with controllers directly through the backplane, or can communicate remotely via a network interface. The adjustable sampling component 110 can adjust sampling rates for industrial units 141, 143, 145 (1 to m, m being an integer) such as those that are maintained on higher-level business servers; units that serve control elements of the system such as programmable logic controllers and/or other industrial control components (e.g., sensors, modules, and the like), for example. A directory service (not shown) can further operate with the organizational model to enable adjustment of sampling rate and collection via embedded historians 121, 123, 125 within the organization. Accordingly, the rate for data collection can be varied based on a plurality of industrial parameters, such as for example: type of data that is to be collected (e.g., collecting one type of data at a higher rate, than another type of data); time of data collection, industrial unit that data is being collected therefrom, criticality of the operation, security level, sequence of function block being executed, and the like.

A network system (not shown) can be associated with the industrial automation system 100, for which the rate of data collection can be adjusted via the rate adjustment component 110. The network system can further include additional hosts (not shown), which may be personal computers, servers or other types of computers. Such hosts generally can be capable of running or executing one or more application-level (or user-level) programs, as well as initiating an I/O request (e.g., I/O reads or writes). In addition, the network system can further include one or more input/output units (I/O units), wherein such I/O units can includes one or more I/O controllers connected thereto, and each of the I/O can be any of several types of I/O devices, such as storage devices (e.g., a hard disk drive, tape drive) or other I/O device. The hosts and I/O units and their attached I/O controllers and devices can be organized into groups such as clusters, with each cluster including one or more hosts and typically one or more I/O units (each I/O unit including one or more I/O controllers). The hosts and I/O units can be interconnected via a collection of routers, switches and communication links (such as wires, connectors, cables, and the like) that connects a set of nodes (e.g., connects a set of hosts and I/O units) of one or more clusters. Each unit be programmed and/or configured to operate in a mode in which it employs a sampling interval to initiate periodic sampling.

It is noted that as used in this application, terms such as "component," "hierarchy," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 2:
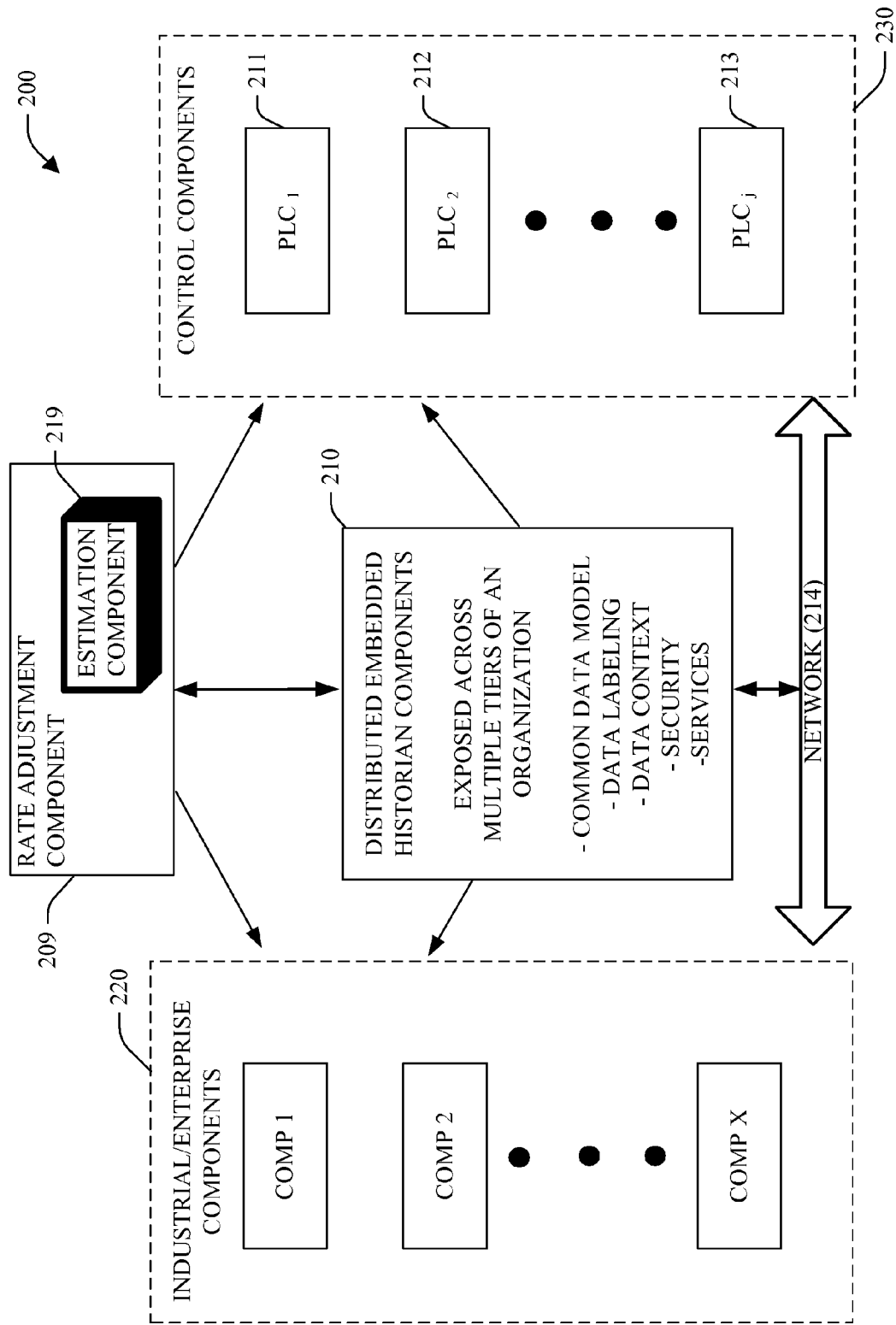
FIG. 2 illustrates a block diagram for a rate adjustment component in accordance with an aspect of the subject innovation.

FIG. 2 illustrates a rate adjustment component 209 for varying data collection rates that further includes an estimation component 219. The estimation component 219 can automatically predict a required sampling rate for a stage of an operation, based on statistical models and/or collected for similar operations history data. For example, a crude model can be constructed for an initial subset of the data using earlier collected data from similar processes. Such allows statistical information to be gleaned from extremely large sets of distributed information related to similar industrial operation. The model can then be evaluated and/or altered via feedback (e.g., user input). Each module can be programmed to be evaluated for the sampling rate periodically, or upon occurrence of an event (e.g., an alarm trigger, receipt of an e-mail notification message, and the like). Various artificial intelligence systems/methodologies can also be employed to facilitate estimation/prediction of the data collection rate (e.g., sampling rate).

The system 200 includes a plurality of embedded historian components 210 operating in an organizational data model, wherein a rate adjustment component 209 can vary a data collection rate for such embedded historians (e.g., micro historians) that are distributed on the back plane of an associated industrial network. In addition, the historian components 210 can be distributed across a network 214 to provide a collective or distributed database. The rate adjustment component 209 can be part of applications running on a control unit 230, which can function as a management control center for the industrial network system.

The industrial setting or organizational enterprise 200 can employ a plurality of computers or network components that communicate across the network 214, to one or more industrial control components 230, such as for example programmable logic controllers (PLCs) 211, 212, 213 (1 to j, j being an integer) or other factory components. Thus, the embedded historian components 210 can be operated as a singular or collective entity while being viewed, managed and distributed across substantially all or portions of the enterprise 220, control component 230 and/or rate adjustment component 209. For example, at the control levels 230, embedded historians can be embedded within a PLC rack to collect data, whereas higher levels at 220 can be employed to aggregate data from lower levels. Such can include higher level software components that communicate across the network 214 to collect data from lower level control components. The network 214 can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and the like. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Likewise, the industrial/enterprise 220 can include various computer or network components such as servers, clients, communications modules, mobile computers, wireless components, and the like which are capable of interacting across the network 214. Similarly, the term PLC as used herein can include functionality that can be shared across multiple components, systems, and/or networks 214. For example, one or more PLCs of the control component 230 can communicate and cooperate with various network devices across the network 214. Such can include substantially any type of control, communications module, computer, I/O device, sensor, Human Machine Interface (HMI)) that communicate via the network 214 which includes control, automation, and/or public networks. The PLC 230 can also communicate to and control various other devices such as Input/Output modules including Analog, Digital, Programmed/Intelligent I/O modules, other programmable controllers, communications modules, and the like.

The system 200 enables combining organizational information such as an organizational or hierarchical data model which represents a common model of a plant that can be based in the S88 or S95 model, and is distributed among computers of the enterprise 220 and industrial controllers 230, for example. The model can be viewed as an Organizational Data Model—a tree-like hierarchical and heterogeneous structure of organizational Units. For instance, respective Organizational Units can include other Organizational Units. Organizational Units can be either physical locations (e.g., Site, Area) or logical grouping node or collection (e.g., Enterprise as a collection of Sites). The nodes in the organizational hierarchy or model can have associated items representing the plant's production and control equipment, tags, backing tags (e.g., Alarm & Event and the like), programs, equipment phases, I/O devices, and other application related entities. These organizational units thus can form an application view of the user's system.

A typical system 200 can assign the upper levels of the hierarchy such as an Enterprise node and site to a computer system and the lower levels such as area, line, cell and machine can be contained in multiple industrial controllers 230; each of which can include components that are members of one or more organization units such as area or area model. Moreover, an organization unit can contain components from one or more controllers. The embedded historian components 210 can be positioned at various levels of the enterprise 220 and/or control 230; and can also further be integrated therein and scaled according to system data collection requirements. Such organizational model enables distributed historian components 210 to locate data of interest for collection purposes and to readily adapt and become integrated within the larger system 200.

Adaptability within the system 200 can be facilitated by data having additional information such as metadata that identifies the purpose of the data, and a granularity level that data associated therewith should be collected for. Such metadata can further be employed by the rate adjustment component 209 to designate rates for data collection by a micro-historian. For example, the configuration component 209 can employ a trail of metadata to identify the historians and relevant historian data for collection Accordingly, one form of data can identify itself as a control tag that has been marked or labeled via metadata to indicate its significance for data collection purposes. Another type of label or metadata can indicate security information that is being distributed throughout the system 200. Furthermore, other type of data can indicate that an alarm condition or an event has occurred within the system and thus, a respective historian component should capture data at a higher granularity level.

Figure 3:
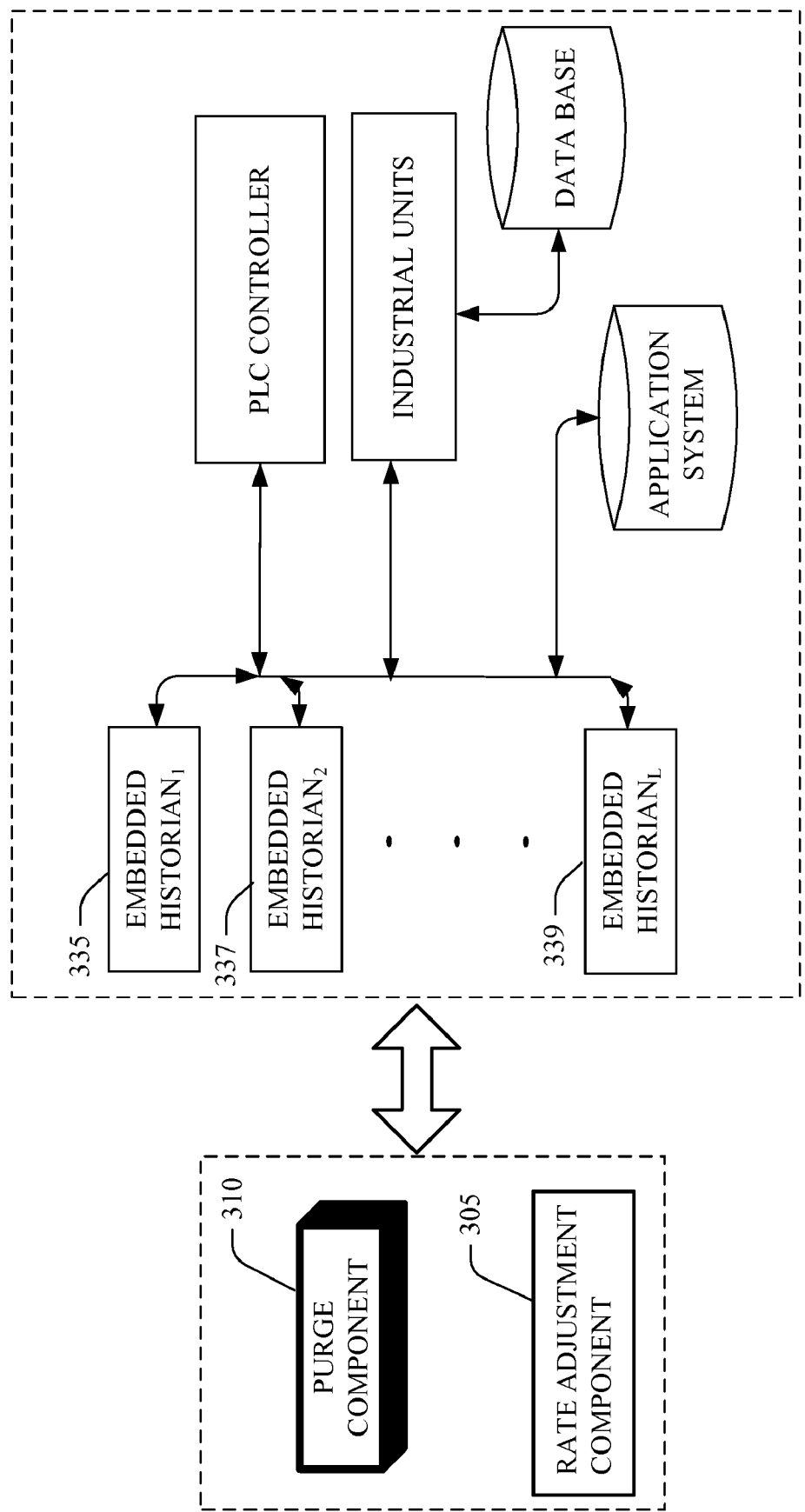
FIG. 3 illustrates a system that can purge collected data according to a further aspect of the subject innovation

FIG. 3 illustrates a general block diagram of a rate adjustment component 310 that further interacts with a purge component 305, in accordance with an aspect of the subject innovation. The rate adjustment component can vary a data collection rate for the embedded historians 335, 337, and 339 (1 to L, L being an integer) to collect data with different level of granularity. The purge component 310 can notify such historians 335, 337, and 339 that they can avail their memory for data override and/or selectively purge the history data storage medium (e.g., upon reaching a predetermined storage capacity, predetermined thresholds, and the like.) Such an arrangement can reduce data backup, and mitigate risk of loss for data stored on a RAM, wherein size of the RAM in such historians 335, 337, 339 is limited and can eventually overload, for example. Data can be initially stored via historians 335, 337, and 339, and such storage can continue until predetermined threshold storage capacities associated with these historians are reached. Upon reaching such predetermined threshold, the purge component 310 can evaluate the stored data (e.g., history data) and notify the embedded historians 335, 337, and 339 to indicate that the data is no longer required and/or is not necessary for future access and hence can be overwritten.

Figure 4:
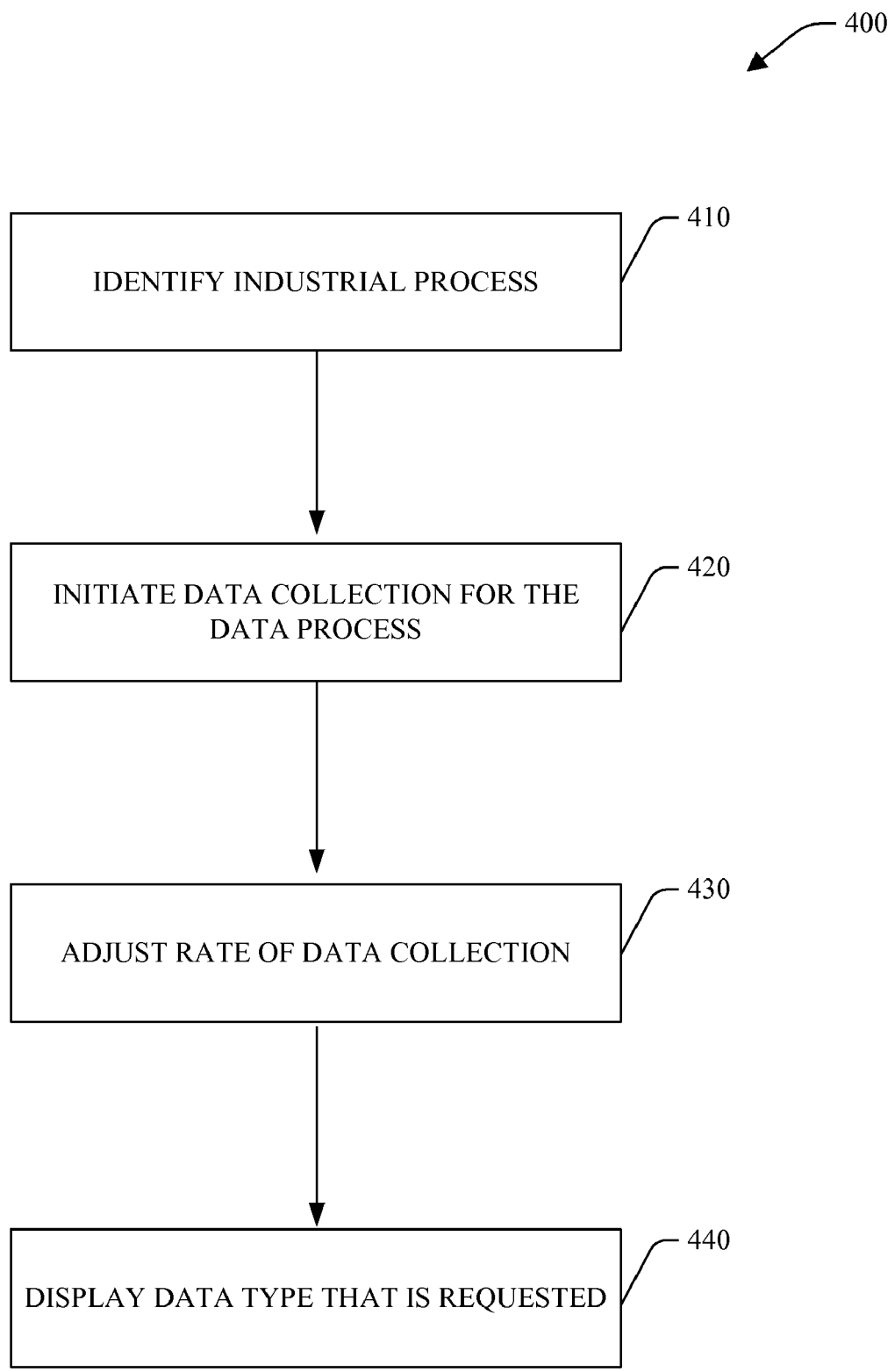
FIG. 4 illustrates an exemplary methodology of rate adjustment in accordance with an aspect of the subject innovation.

FIG. 4 illustrates a related methodology of gathering data based on a plurality of granularity levels for the industrial process. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described. Initially, and at 410 an industrial operation for which data collection is required can be identified. Such data is typically collected at 420 and stored for a subsequent analysis in case of future trouble shooting, for example. Next, and at 430 rate of data collection can be adjusted based on desired level of granularity. For example, a higher sample rate for data collection (than sample rate during normal operation) can be employed when collecting data from an operation stage that is deemed more critical than the rest of the operation. The rate adjustment component can be associated with embedded historians and/or local recording modules that supply a direct interface to controllers without employing a transitional layer, and hence provide a substantially higher data exchange rate as compared to conventional PC historians. Next, and at 440 desired data can be displayed to a user.

Figure 5:
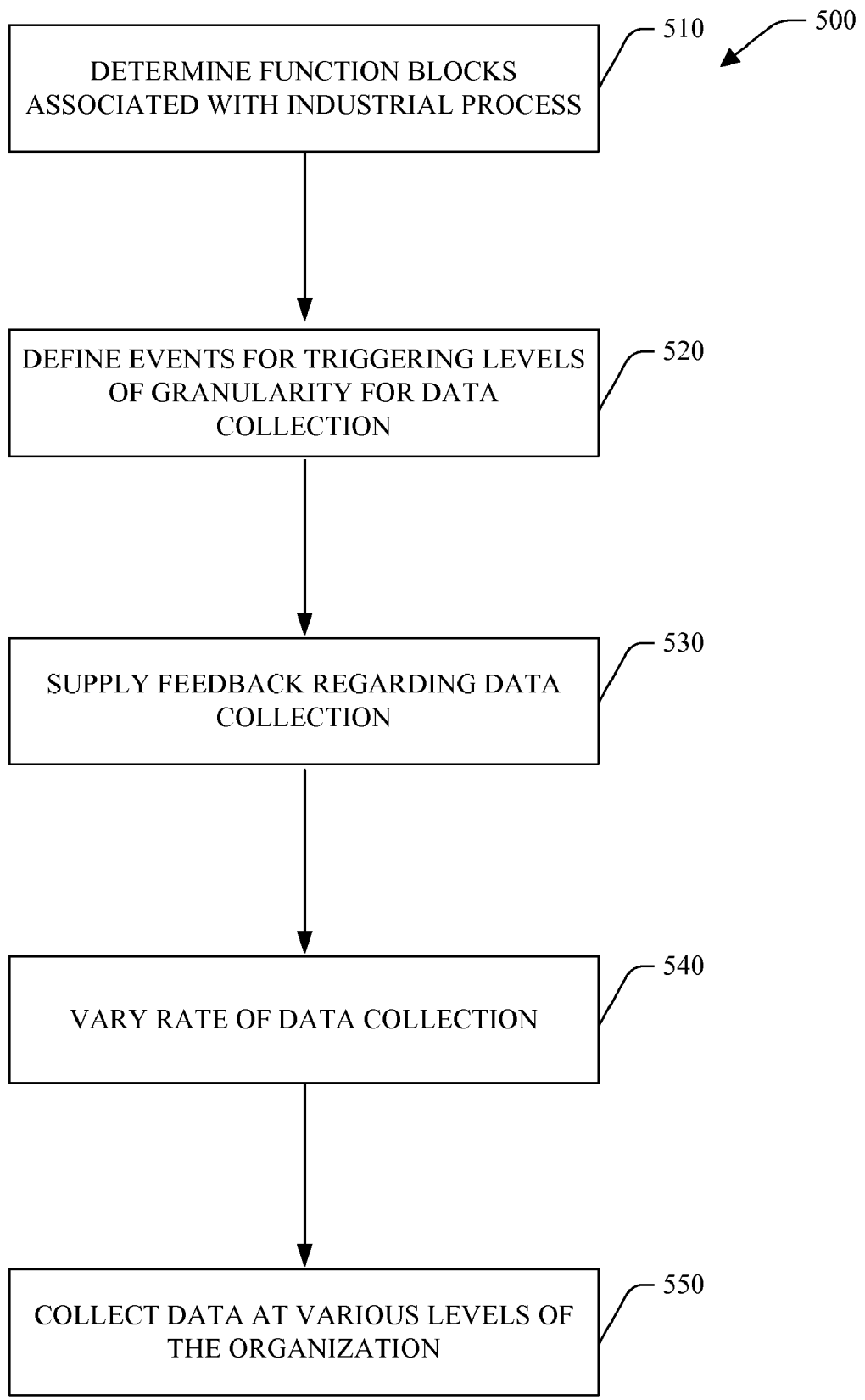
FIG. 5 illustrates a particular methodology of data collection in accordance with a particular aspect of the subject innovation.

FIG. 5 illustrates a further methodology in accordance with a further aspect of the subject innovation. Initially, and at 510 various function blocks that are associated with such industrial process can be determined. In general, such function blocks can pertain to a control strategy, which can be downloaded to one or more control modules in the control system. Moreover, the control functions represented by the function blocks are implemented in the verified control routine according to execution ordering which may be determined in the compilation or verification process in the configuration tool.

A plurality of triggering events can subsequently be defined at 520 that correspond to execution of a particular granularity of data collection associated with such function blocks. For example, such triggering event can be based on an execution order, data importance, likelihood of use, and the like. Next, and at 530 feedback can be provided (e.g., a plant engineer, operator) regarding efficiency of such data collection. Based on such feedback, and/or based on predetermined criteria (e.g., data criticality for future trouble shooting) a rate for data collection can be varied, at 540. Next and at 550, data collection can proceed based on such adjusted rate of data collection.

Figure 6:
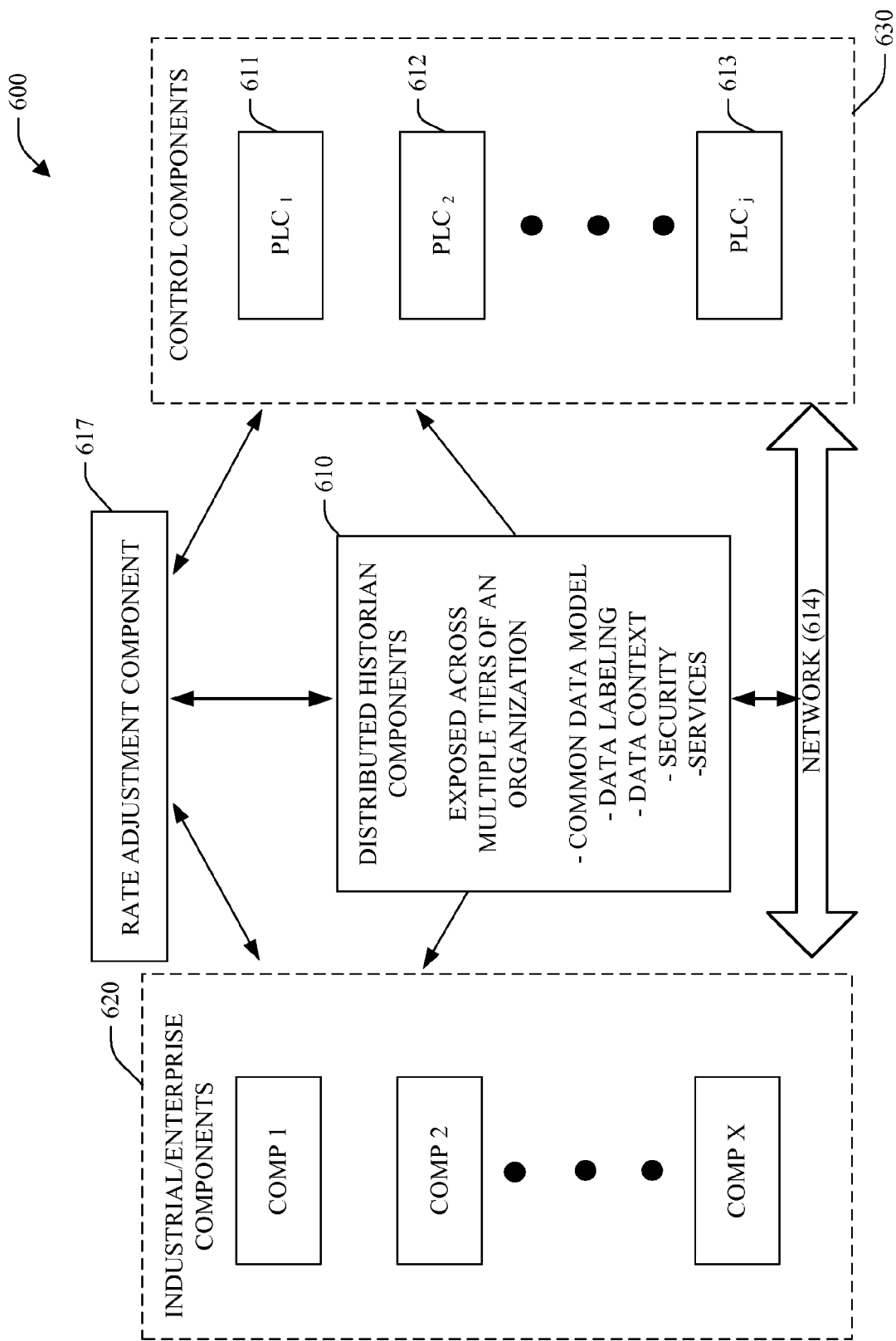
FIG. 6 illustrates an exemplary industrial automation network that employs a rate adjustment component to vary rate of data capture.

FIG. 6 illustrates a block diagram of a rate adjustment component 617 that that can vary a data collection rate that are collected by the distributed historians component 610, associated with the industrial setting 600. As described in detail supra, difference in the granularity level for data collection can be in part in response to fault detection, alert triggering, and other process parameters during execution. Hence, future trouble shooting efforts can be performed with respect to data that is typically collected at an adjustable rate.

Data at such adjusted rate can be captured via a plurality of distributed embedded historian components 610. For example, data can automatically be captured at a first sample collection rate at onset of activities relating to a function block or activity. Likewise, data collection automatically stops at such first sample collection rate, upon completion of the function block, and hence, relevant data to various performance stages can automatically be gathered, and stored for future trouble shooting via the distributed historian components 610.

The rate adjustment component 617 can be part of applications running on the control components 611, 612, 613, which can function as a management control center for the industrial network system 600. Accordingly, a distributed historian framework is provided, wherein historical data types can be collected based on triggering events at particular data collection granularity levels, which are set by the rate adjustment component 617 (e.g., a specific data collection rate for particular data collected, such that collected data at such specific rate can address subsequent problems that may arise during the industrial process).

A network system 614 can be associated with the industrial automation system 600. The network system 614 can further include additional hosts (not shown), which may be personal computers, servers or other types of computers. Such hosts generally can be capable of running or executing one or more application-level (or user-level) programs, as well as initiating an I/O request (e.g., I/O reads or writes). In addition, the network system can further include one or more input/output units (I/O units), wherein such I/O units can includes one or more I/O controllers connected thereto, and each of the I/O can be any of several types of I/O devices, such as storage devices (e.g., a hard disk drive, tape drive) or other I/O device. The hosts and I/O units and their attached I/O controllers and devices can be organized into groups such as clusters, with each cluster including one or more hosts and typically one or more I/O units (each I/O unit including one or more I/O controllers). The hosts and I/O units can be interconnected via a collection of routers, switches and communication links (such as wires, connectors, cables, and the like) that connects a set of nodes (e.g., connects a set of hosts and I/O units) of one or more clusters.

It is noted that as used in this application, terms such as "component," "hierarchy," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components can reside within a process and/or thread of execution and a component may be localized on one computer and/or distributed between two or more computers, industrial controllers, and/or modules communicating therewith.

Figure 7:
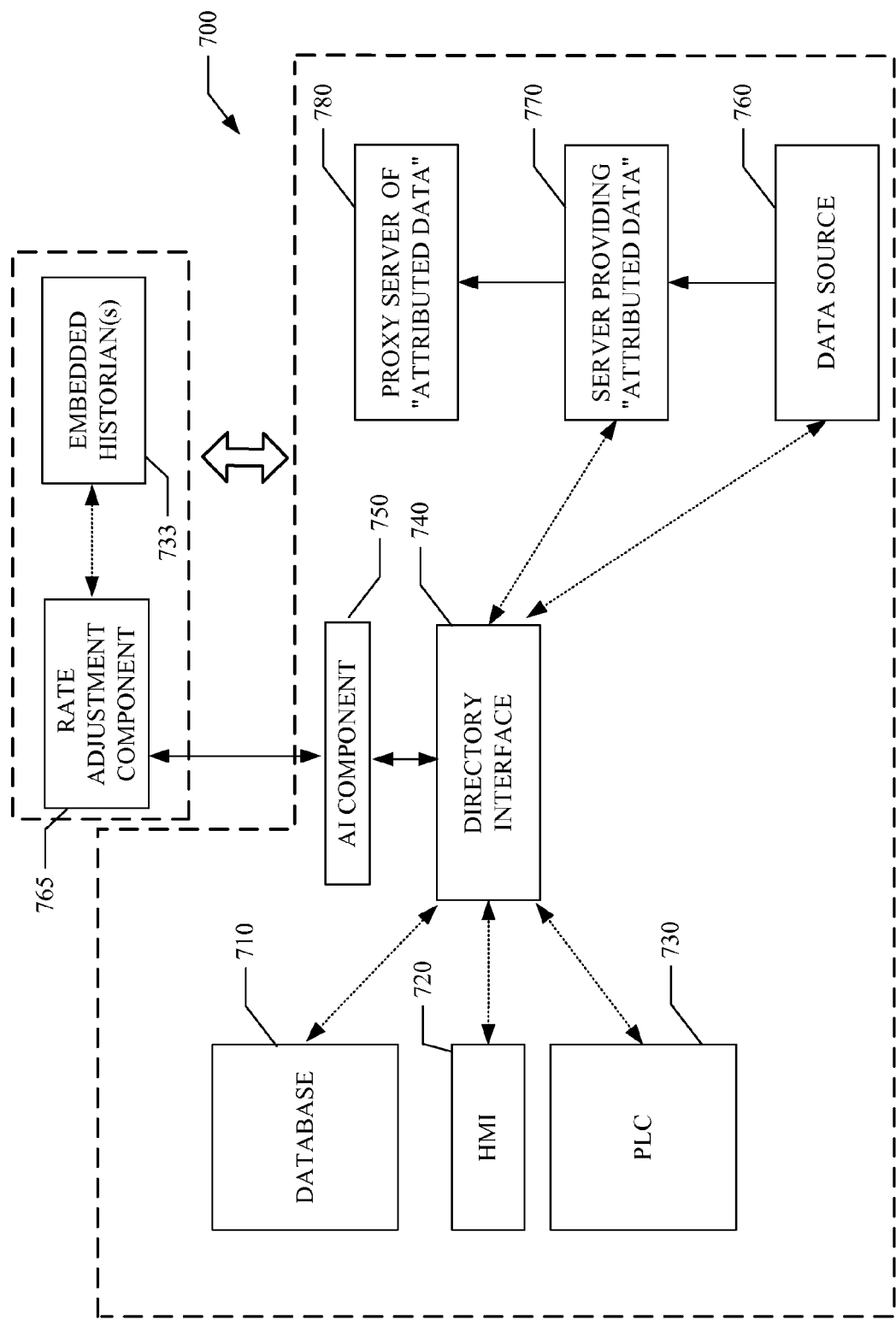
FIG. 7 illustrates a rate adjustment component as part of an industrial setting in accordance with an aspect of the subject innovation.

FIG. 7 illustrates an exemplary industrial automation network that employs a rate adjustment component 765 that configures a rate for data collections, which is to be maintained by embedded historian component 733. Such rate adjustment component 765 can assign a higher rate for data collection (than data collection rate during normal operation) when collecting data from an operation stage that is deemed more critical than the rest of the operation of the industrial setting 700, for example. The industrial setting 700 can further include a database 710, a human machine interface (HMI) 720 and a programmable logic controller (PLC) 730, and a directory interface 740. The rate adjustment component 765 can further associate with an Artificial Intelligence (AI) component 750 to facilitate determination of rate for data collection, and accumulation of such history data via the embedded historians 733.

For example, in connection with determining a rate collection associated with a control algorithm and/or initiating of data capture, the subject invention can employ various artificial intelligence schemes. A process for learning explicitly or implicitly whether data from a historian should be downloaded, can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)$=confidence(class). As shown in FIG. 7, an artificial intelligence (AI) component 750 can be employed to facilitate inferring and/or determining when, where, how to vary a rate of data collection. The AI component 750 can employ any of a variety of suitable AI-based schemes as described supra in connection with facilitating various aspects of the subject invention.

In addition, the directory interface 740 can be employed to provide data from an appropriate location such as the data source 760, a server 770 and/or a proxy server 780. Accordingly, the directory interface 740 can point to a source of data based upon role and requirements (needs) of a requester (e.g., database 710, HMI 720, PLC 530, and the like.) The database 710 can be any number of various types such as a relational, network, flat-file or hierarchical systems. Typically, such databases can be employed in connection with various enterprise resource planning (ERP) applications that can service any number of various business related processes within a company. For example, ERP applications can be related to human resources, budgeting, forecasting, purchasing and the like. In this regard, particular ERP applications may require data that has certain desired attributes associated therewith. Thus, in accordance with an aspect of the subject invention, the directory interface 740 can provide data to the database 710 from the server 770, which provides data with the attributes desired by the database 710.

Moreover, the HMI 720 can employ the directory interface 740 to point to data located within the system 700. The HMI 720 can be employed to graphically display various aspects of a process, system, factory, etc. to provide a simplistic and/or user-friendly view of the system. Accordingly, various data points within a system can be displayed as graphical (e.g., bitmaps, jpegs, vector based graphics, clip art and the like) representations with desired color schemes, animation, and layout.

The HMI 720 can request data to have particular visualization attributes associated with data in order to easily display such data thereto. For example, the HMI 720 can query the directory interface 740 for a particular data point that has associated visualization attributes. The directory interface 740 can determine the proxy server 780 contains the attributed data point with the desired visualization attributes. For instance, the attributed data point can have a particular graphic that is either referenced or sent along with the data such that this graphic appears within the HMI environment instead of or along with the data value.

As explained earlier, the PLC 730 can be any number of models such as Allen Bradley PLC5, SLC-500, MicoLogix, and the like. The PLC 730 is generally defined as a specialized device employed to provide high-speed, low-level control of a process and/or system. The PLC 730 can be programmed using ladder logic or some form of structured language. Typically, the PLC 730 can utilize data directly from a data source (e.g., data source 760) that can be a sensor, encoder, measurement sensor, switch, valve and the like. The data source 760 can provide data to a register in a PLC and such data can be stored in the PLC if desired. Additionally, data can be updated (e.g., based on a clock cycle) and/or output to other devices for further processing.

Figure 8:
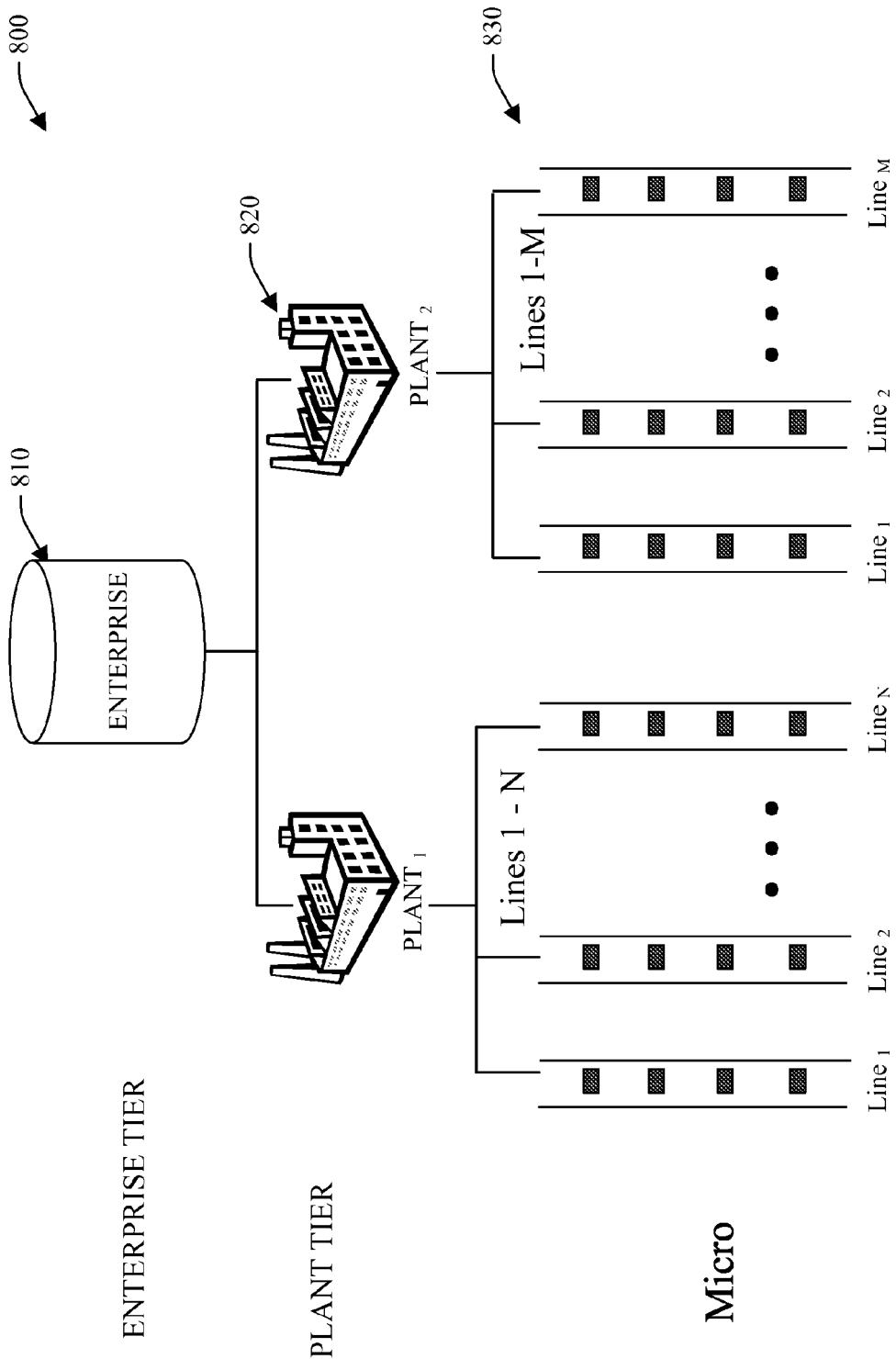
FIG. 8 illustrates an exemplary multi-tiered and distributed historian system, which can employ a rate adjustment component in accordance with an aspect of the subject innovation.

FIG. 8 illustrates an exemplary multi-tiered and distributed historian system 800, which can employ a rate adjustment component in accordance with an aspect of the subject innovation. The exemplary system 800 illustrates three tiered historian level, wherein the highest data collection tier is illustrated and can be referred to as the enterprise tier 810. This tier aggregates data collected from lower level tiers such as from a plant tier 820 and a micro or embedded tier 830. As illustrated, the tiers 810 and 820 can include archival or permanent storage capabilities. In the system 800, data can be collected from two plants at the tier 820, and from a plurality of historian components at tier 830. It is to be appreciated that such an arrangement is exemplary in nature, and other arrangements are well within the realm of the subject innovation.

Typically, the system 800 can be viewed as a Distributed Historian that spans machines, plants, and enterprises. At level 830, the historian collects data at the rack level and is coupled to Common Plant Data Structure described above. Such can include collecting process & discrete data, alarms & events in a single archive if desired. Other aspects can include auto-discovery of data and context from controllers in local chassis including store/forward data capabilities from local buffers. Data can be collected without polling, having a low communications bandwidth. The plant level 820 aggregates data from Micro or rack-embedded Historians and/or other data sources (e.g., Live Data source). Such can include plant-level querying, analytics, reporting while efficiently storing, retrieving, and managing large amounts of data. This level can also auto-discover data and data model context from Micro Historians located at level 830. Other features of the system 800 can include analysis components, logical units, components for interaction with report elements, embeddable presentation components, replication of configuration, storage, archiving, data compression, summarization/filtering, security, and scalability.

Figure 9:
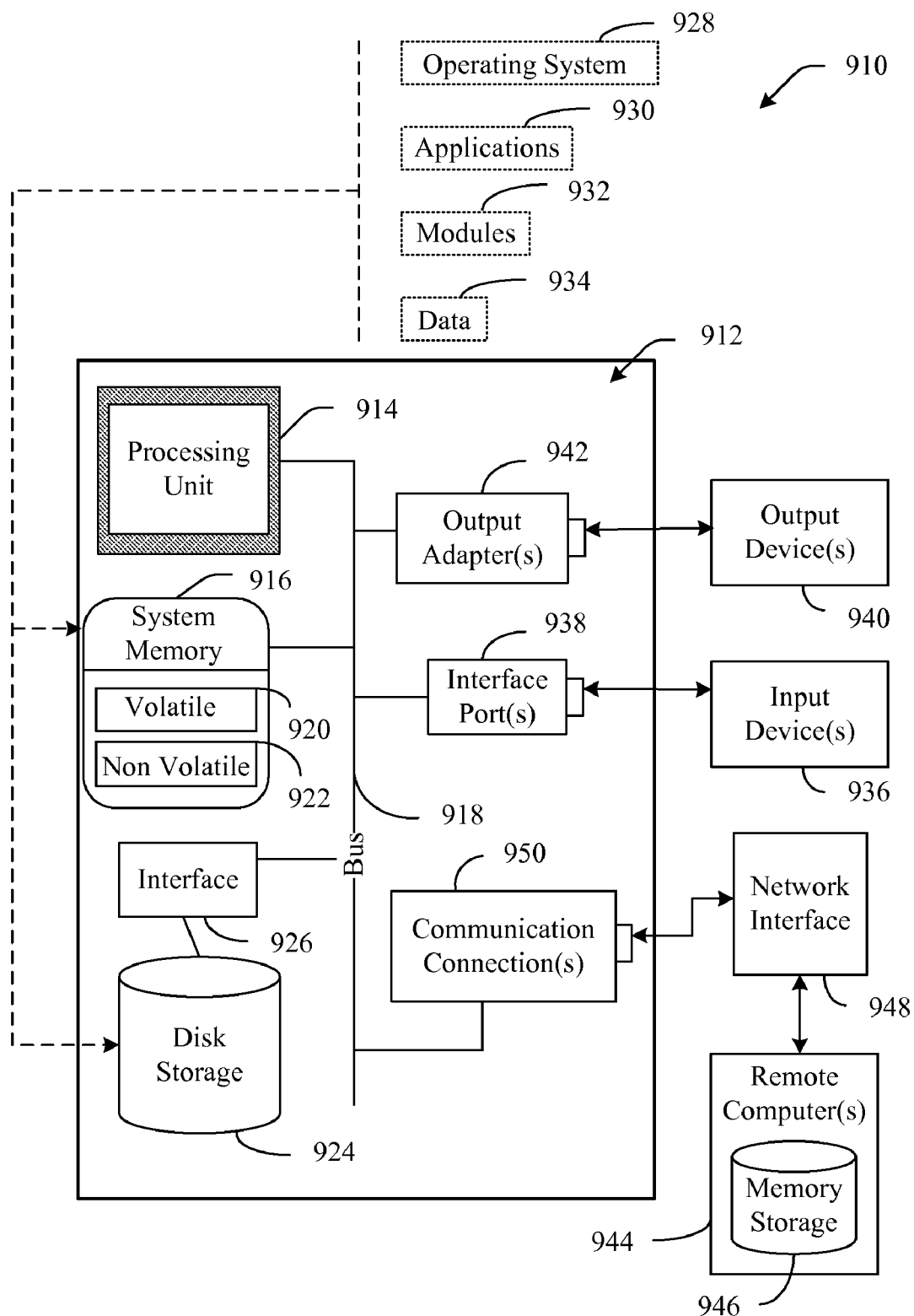
FIG. 9 illustrates an exemplary computing environment that can be implemented as part of a data with varying rate in accordance with an aspect of the subject innovation.

FIG. 9, an exemplary environment 910 for implementing various aspects of the data capture unit, which can include computer 912, as part of the rate adjustment component. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

FIG. 10 also illustrates an exemplary environment that can employ a rate adjustment component to collect data in accordance with various aspects of the subject innovation. Each functional module 1014 is attached to the backplane 1016 by means of a separable electrical connector 1030 that permits the removal of the module 1014 from the backplane 1016 so that it may be replaced or repaired without disturbing the other modules 1014. The backplane 1016 provides the module 1014 with both power and a communication channel to the other modules 1014. Local communication with the other modules 1014 through the backplane 1016 is accomplished by means of a backplane interface 1032 which electrically connects the backplane 1016 through connector 1030. The backplane interface 1032 monitors messages on the backplane 1016 to identify those messages intended for the particular module 1014, based on a message address being part of the message and indicating the message destination. Messages received by the backplane interface 1032 are conveyed to an internal bus 1034 in the module 1014.

The internal bus 1034 joins the backplane interface 1032 with a memory 1036, a microprocessor 1028, front panel circuitry 1038, I/O interface circuitry 1039 and communication network interface circuitry 1041. The microprocessor 1028 can be a general purpose microprocessor providing for the sequential execution of instructions included within the memory 1036 and the reading and writing of data to and from the memory 1036 and the other devices associated with the internal bus 1034. The microprocessor 1028 includes an internal clock circuit (not shown) providing the timing of the microprocessor 1028 but may also communicate with an external clock 1043 of improved precision. This clock 1043 may be a crystal controlled oscillator or other time standard including a radio link to an external time standard. The precision of the clock 1043 may be recorded in the memory 1036 as a quality factor. The panel circuitry 1038 includes status indication lights such as are well known in the art and manually operable switches such as for locking the module 1014 in the off state.

The memory 1036 can comprise control programs or routines executed by the microprocessor 1028 to provide control functions, as well as variables and data necessary for the execution of those programs or routines. For I/O modules, the memory 1036 may also include an I/O table holding the current state of inputs and outputs received from and transmitted to the industrial controller 1010 via the I/O modules 1020. The module 1014 can be adapted to perform the various methodologies of the innovation, via hardware configuration techniques and/or by software programming techniques.

What has been described above includes various exemplary aspects. It is, of course, not possible to describe every conceivable combination of components or methodologies for purposes of describing these aspects, but one of ordinary skill in the art may recognize that many further combinations and permutations are possible. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the innovation. In this regard, it will also be recognized that the innovation includes a system as well as a computer-readable medium having computer-executable instructions for performing the acts and/or events of the various methods of the innovation. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system, comprising:
   at least one embedded historian integrated within an industrial controller that collects data from an industrial process at an adjustable sampling rate;
   a rate adjustment component configured to vary the sampling rate for the at least one embedded historian based on a stage of the industrial process being performed; and
   a storage medium configured to store the data collected by the at least one embedded historian and that manages a gradual decay for stored data,
   wherein a first data collection sampling rate is associated with a normal operation stage of the industrial process, and a second data collection sampling rate is associated with a critical stage of the industrial process, and wherein the rate adjustment component is configured to cause the at least one embedded historian to sample data from the industrial process at the first sampling rate during the normal operation stage, and to sample data from the industrial process at the second sampling rate during the critical stage.

2. The industrial automation system of claim 1, further comprising an estimation component configured to generate a prediction of a required data sampling rate for a stage of the industrial process using a statistical model constructed based on prior data collected by the at least one embedded historian, the rate adjustment component configured to adjust the sampling rate for the at least one embedded historian in accordance with the prediction as the stage of the industrial process is being executed.

3. The industrial automation system of claim 2, further comprising a component configured to receive manual feedback regarding an efficiency of the data collection and to adjust the statistical model based on the feedback.

4. The industrial automation system of claim 1, further comprising a hierarchical data model representing the industrial automation system that is distributed to at least one controller in the industrial automation system and that has nodes representing units associated with the industrial automation system, the hierarchical data model enabling the at least one embedded historian to locate data of interest within the industrial automation system for collection.

5. The industrial automation system of claim 4, further comprising a directory service configured to operate with the hierarchical data model to enable adjustment of sampling rate and data collection via the at least one embedded historian.

6. The industrial automation system of claim 1, further comprising an artificial intelligence component configured to facilitate determination of a data collection sampling rate by the at least one embedded historian.

7. The industrial automation system of claim 1, wherein each of the at least one embedded historian is associated with at least one of a controller, a module in a chassis, a server, a sensor, or a factory component.

8. The industrial automation system of claim 1, wherein the rate adjustment component is part of an application that runs on a control unit and that functions as a management control center.

9. The industrial automation system of claim 1, further comprising a purge component configured to evaluate the stored data and to notify the at least one embedded historian whether data stored on memory associated with the at least one embedded historian is permitted to be overwritten.

10. The industrial automation system of claim 1, wherein the rate adjustment component is configured to adjust the sampling rate for the at least one embedded historian in response to a detected fault condition on the industrial automation system.

11. A method of collecting data via embedded historians within an industrial plant comprising:
identifying a process for collection of history data;
associating a first data collection sample rate with a first stage of the process;
associating a second data collection sample rate with a second stage of the process;
adjusting a data collection sample rate of an embedded historian to the first data collection sample rate when the first stage of the process is being executed;
adjusting the data collection sample rate of the embedded historian to the second data collection sample rate when the second stage of the process is being executed;
storing history data collected by the embedded historian to a storage medium associated with the embedded historian; and
providing a gradual decay of the stored history data.

12. The method of claim 11, further comprising:
associating a selected granularity of data collection with each of a plurality of function blocks that define and execute control functions that control the process; and
adjusting the data collection sample rate of the embedded historian as the function blocks are executed to achieve the selected granularity of data collection for each of the plurality of function blocks.

13. The method of claim 12, further comprising defining a plurality of triggering events that correspond to execution of granularity levels associated with the plurality of functional blocks.

14. The method of claim 13, further comprising
receiving feedback regarding efficiency of collecting data at the respective granularity levels; and
adjusting the data collection sample rate of the embedded historian based at least on the feedback.

15. The method of claim 13, further comprising collecting data based on the plurality of triggering events.

16. The method of claim 13, further comprising automatically capturing data at a data collection sample rate associated with a given function block upon onset of activities relating to the given functional block.

17. The method of claim 13, further comprising setting the data collection sample rate of the embedded historian based on type of data to be collected.

18. The method of claim 11, further comprising collecting data across various levels of the industrial plant via a distributed plurality of embedded historians.

19. The method of claim 11, further comprising adjusting the data collection sample rate of the embedded historian based on a time of the data collection.

20. A computer implemented system comprising the following computer executable components:
a rate adjustment component configured to vary a data collection sample rate for embedded historians that collect data from an industrial process for storage in a storage medium, the sample rate varied as a function of which stage of the industrial process is being executed to achieve a specified level of data collection granularity for the respective stages;
a purge component service configured to determine whether the data is required for future use and to purge the data from the storage medium if it is determined that the data is not required for future use; and
a directory that determines where a source or destination for a historian data structure is located.

21. The computer implemented system of claim 20, further comprising an artificial intelligence component configured to facilitate determining the data collection sample rate.

22. The computer implemented system of claim 20, further comprising a database configured to provide business related services the historians.

23. The computer implemented system of claim 20, wherein the rate adjustment component is part of an application that runs on a control unit of an industrial plant.

24. An industrial controller system comprising:
means for collecting data related to an industrial process with an embedded historian;
means for associating a first data collection sample rate and a second data collection sample rate with a first stage of the industrial process and a second stage of the industrial process, respectively;
means for adjusting a data collection sample rate of the embedded historian to the first data collection sample rate during execution of the first stage of the industrial process;
means for adjusting the data collection sample rate of the embedded historian to the second data collection sample rate during execution of the second stage of the industrial process;
means for storing the data collected by the means for collecting and supplying a gradual decay of stored data.

25. The industrial controller system of claim 24, further comprising means for graphically displaying a view of the industrial controller system.

26. The industrial controller system of claim 25, further comprising means for representing units associated with an industrial plant as nodes within an organizational data model.

27. The industrial controller system of claim 24, further comprising means for pointing to a source of data to be collected by the embedded historian based at least on a role of a requester of the data.

28. The industrial controller system of claim 24, further comprising:
    means for determining whether the stored data is required for future use; and
    means for purging the stored data if it is determined that the stored data is not required for future use.

29. The industrial controller system of claim 24, further comprising means for directly interfacing the embedded historian to an industrial controller.

* * * * *